A. J. LUNDSTROM.
METHOD OF INSTALLMENT PAYMENT ACCOUNTING.
APPLICATION FILED AUG. 3, 1918.
1,413,041.
Patented Apr. 18, 1922.
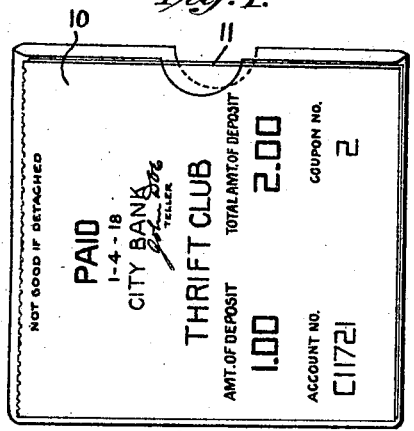
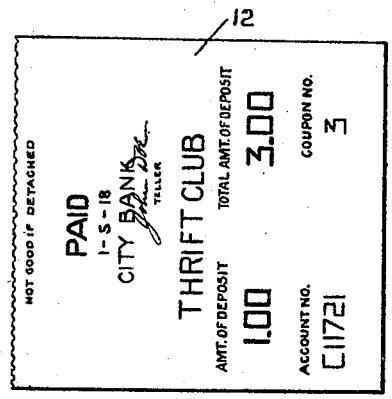
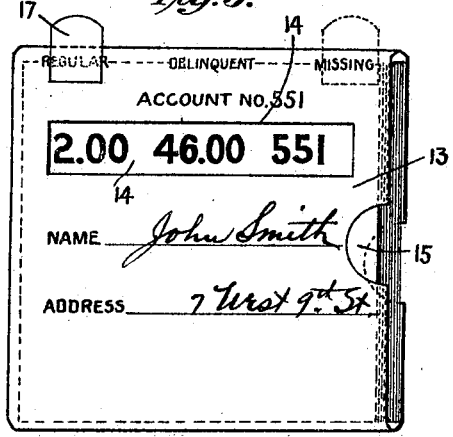
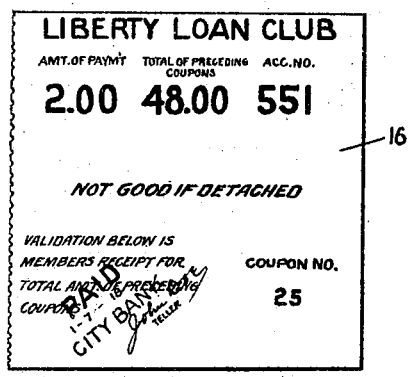
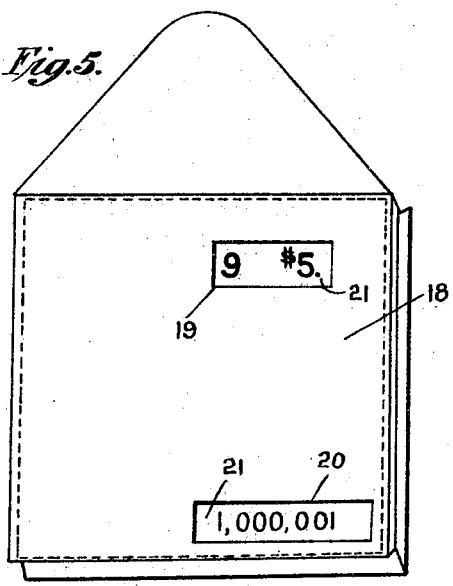
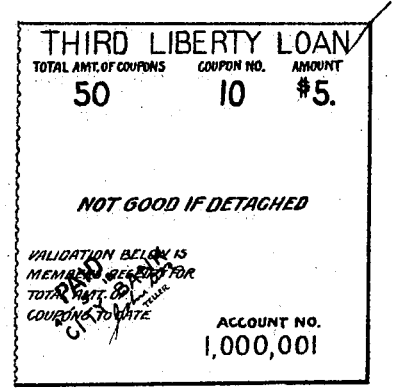
Andrew J. Lundstrom
Inventor
by W. B. Whitney
Atty.

UNITED STATES PATENT OFFICE.

ANDREW J. LUNDSTROM, OF BROOKLYN, NEW YORK, ASSIGNOR TO GEORGE E. CARHART, OF NEW YORK, N. Y.

METHOD OF INSTALLMENT-PAYMENT ACCOUNTING.

1,413,041. Specification of Letters Patent. Patented Apr. 18, 1922.

Application filed August 3, 1918. Serial No. 248,179.

*To all whom it may concern:*

Be it known that I, ANDREW J. LUNDSTROM, a citizen of the United States, residing at Brooklyn, city of New York, in the county of Kings and State of New York, have invented certain new and useful Improvements in Methods of Installment-Payment Accounting, of which the following is a specification.

Coupon deposit books have now been very widely adopted by banks for use in connection with special savings accounts commonly known as "Christmas," "Vacation," and "Thrift" clubs, and, recently, have been taken up by many banks and by various committees in charge of Liberty loan subscriptions and are being used more generally and in larger and larger numbers on each succeeding bond issue for the accounts of persons subscribing to bonds on various partial or installment payment plans.

The coupons of each book are serially numbered and also bear a common account or book number; and the usual practice is for the bank, as each book is issued, to open a ledger account with the depositor or subscriber on a ledger card or sheet bearing a corresponding account number. Then, as each deposit or payment is made to the issuing bank, the book is presented to the teller who removes the coupon paid and receipts therefor by suitably marking either the stub from which the coupon has been detached or the first of the remaining coupons. The coupons thus paid and removed from different books are each day assorted numerically according to their account numbers, handed to a ledger clerk who posts from them to their respective ledger cards or sheets, and then filed either separately in envelopes bearing corresponding account numbers or, in perhaps the majority of cases, all together in a package marked with the date of payment, the envelopes or packages being thereupon placed in a vault where the coupons can be found and referred to should any question or dispute subsequently arise. In one case there are as many envelopes as there are accounts, while in the other case the number of packages will approximate to the number of banking days.

For the Third Liberty loan a plan, known as the centralized plan, was adopted in several of the larger districts, by which installment payments on bond subscriptions could be made either at the bank which issued the coupon book or at any one of a large number of designated banks and stations within the district. According to this plan, each bank or station receiving payments daily lists the paid coupons on a remittance slip and sends the coupons, remittance slip, and a check for the total amount of all coupons listed to the Federal reserve bank for the district or other central station. At this central station, the packages received from the individual receiving agencies go first to a cashier's clerk, who checks up each remittance with the total amount listed on the accompanying remittance slip. The remittance slips and coupons are then turned over to mailing clerks and the coupons are compared with the lists of numbers on the slips. The coupons are next sent to the assorting department where they are sorted and arranged in order according to their account or book numbers. After this has been done the coupons are turned over to a corps of ledger clerks, who post the payments represented by the coupons to the correspondingly numbered ledger sheets. And, finally, the coupons are handed in to the filing department where filing clerks distribute them in envelopes bearing corresponding account numbers. When the payments are completed the ledger department so advices the bond department, and the bonds are either delivered by mail to or are called for by the subscribers.

The object of my invention is to simplify and thereby to lessen the cost of the coupon book method of handling installment payment accounts; and this object I accomplish by the means and in the manner hereinafter set forth.

The invention consists, briefly stated, in providing books in which each coupon has printed on the face thereof, in addition to its own serial and the common book account number and the amount to be paid thereon, the total amount of the first and each succeeding coupon to and including the individual coupon, or merely to but not including the individual coupon (since such amount plus the amount of that coupon will equal the former total), and by further providing with each book a filing envelope or container which is made of transparent material or in such manner that one can read from outside the account number of a coupon placed therein and enough of the other matter printed on the face of the coupon as will show the total amount then paid in on the account by the holder of the book. The first paid coupon detached from each book, after the coupons from all the different books have been assorted, is filed face outwardly in a separate filing envelope, and each succeeding coupon detached when paid from the same book is in turn filed in the same container face outwardly on top of the coupon or coupons previously filed therein. These filing containers, which exhibit on their faces all the data required to give the exact condition of each account, are used as substitutes for ledger cards and may be arranged and kept in numerical order in the same way in which such cards are filed. I am thus able to eliminate entirely the ledger department heretofore required for handling these installment payment accounts and thereby to save the expense of from one to as many as one hundred ledger or posting clerks—a saving of fully $50,000 per annum in the case of the central station of a large district, such as the district of New York, using the above described centralized plan for Liberty bond issues.

The invention will be fully understood by reference to the accompanying drawings, in which—

Figure 1 is a perspective view of a filing envelope embodying my invention, showing through the front thereof the face of the second of two paid and detached coupons on file therein, and Fig. 2 is a plan or face view of the third of the same series of coupons paid and detached ready to be filed; Fig. 3, a perspective view of a modified container, showing through an opening in the face thereof certain of the data printed on the last of a series of paid and detached coupons filed therein, and Fig. 4, a face view of the next succeeding paid and detached coupon from the same coupon book; Fig. 5, a perspective view of a third form of filing envelope, showing through openings in its face data printed on the last of several paid and detached coupons filed therein and differing somewhat from the coupons previously shown, and Fig. 6, a face view of the next succeeding paid coupon detached from the same book.

Referring to the drawings, the filing envelope 10 illustrated in Fig. 1 is in its simplest form, being merely a plain envelope container which is made of suitable transparent paper or other material and is left open along one side to receive the coupons. The printed matter on a paid and detached coupon 11, the second of two coupons filed therein, is seen through what may be called the front of the envelope, which thus shows on its face, as here indicated, that the sum of $1.00 has been paid on coupon No. 2 of Thrift Club account C 11721 and that the total amount paid into this account is $2.00. The third coupon 12 from the same Thrift Club book is shown in Fig. 2, stamped as paid and detached, ready to be filed in the envelope face outwardly on top, or in front, of coupon No. 2.

The filing envelope 13 illustrated in Fig. 3 is similar in form to that shown in Fig. 1, but is made of non-transparent material and is provided with an opening 14, which may or may not be covered on the inside with a strip of transparent paper. The amounts and figures "2.00 46.00 551" which appear within this opening are part of the data printed, to register with the opening, on the coupon 15 last filed therein and represent respectively the amount of the coupon, the total amount of the preceding coupons from the same book, and the account number of the book; and they indicate at a glance to one familiar with the system that $48.00 (2.00 plus 46.00) has been paid in on account No. 551 in twenty-four installments of $2.00 each and that this last coupon, the one visible through the opening, is coupon No. 24. This envelope, besides having on its front appropriately designated spaces in which to fill in the number of the account with which it is used and the name and address of the holder of the account, may be provided with a tab 17 which, projecting above the upper edge of the envelope and affixed at one or another of several positions in the length thereof indicated by the words "Regular", "Delinquent", and "Missing" shows by its position (as here illustrated) that the account is "regular", or that the holder is behind in his payments or (in the position indicated by dotted lines) that some of the coupons are missing. An entire coupon 16, the next in the series stamped as paid and ready to be filed, is shown in Fig. 4.

As shown in Fig. 5, the filing envelope 18 is of the expansible or bellows type and its front is provided with two openings 19 and 20 which respectively register with and through which are seen the coupon No. "9" and the amount "$5." and the account number "1,000,001" of the coupon 21 last filed therein, thereby indicating, as here illustrated, that on subscription No. 1,000,001 for the Third Liberty loan nine payments of $5. each, a total of $45., have been made; and in Fig. 6 coupon No. 10 from the same coupon book, indicated by the reference number 22, is shown ready for filing.

Having explained the principle of my invention and illustrated and described in different forms practical means for carrying it into effect, what I claim as new, and desire to secure by Letters Patent, is—

1. The method of installment payment accounting which comprises providing both a series of coupons each having printed on its face data from which can be determined the number of the individual coupon in the series, the amount thereof, and the total amount of the preceding coupons in the series, and a filing container adapted to receive the entire series of coupons and to display through the front thereof the said printed data on a coupon filed therein and then as each coupon is paid and surrendered filing the same without posting or other entry face outwardly in the container in front of the coupons previously filed therein.

2. The method of installment payment accounting without ledger or other posting which comprises providing both a series of installment payment coupons each having on its face printed data indicating the series of the coupon, the number of the individual coupon in such series, the amount of the individual coupon, and the total amount of the coupons in the series to and including the individual coupon and a filing container adapted to receive the entire series of coupons and to display through the front thereof sufficient of the data printed on each coupon as placed therein to identify the coupon and the total amount paid on the series of coupons to and including such coupon solely by filing each coupon as paid face outwardly in the container in front of the earlier coupons of the series previously paid and filed therein.

ANDREW J. LUNDSTROM.